US011153893B2

(12) United States Patent
Anderson

(10) Patent No.: US 11,153,893 B2
(45) Date of Patent: *Oct. 19, 2021

(54) SCHEDULING AND COORDINATION IN A WIRELESS NETWORK

(71) Applicant: Intellectual Ventures Holding 81 LLC, Las Vegas, NV (US)

(72) Inventor: Nicholas William Anderson, Exeter (GB)

(73) Assignee: INTELLECTUAL VENTURES II LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/979,938

(22) Filed: Dec. 28, 2015

(65) Prior Publication Data

US 2016/0113029 A1 Apr. 21, 2016

Related U.S. Application Data

(63) Continuation of application No. 14/268,545, filed on May 2, 2014, now Pat. No. 9,225,480, which is a
(Continued)

(51) Int. Cl.
*H04W 72/12* (2009.01)
*H04W 72/08* (2009.01)
(Continued)

(52) U.S. Cl.
CPC ...... *H04W 72/1231* (2013.01); *H04B 17/345* (2015.01); *H04J 11/005* (2013.01);
(Continued)

(58) Field of Classification Search
CPC .............................................. H04W 72/1231
See application file for complete search history.

(56) References Cited

U.S. PATENT DOCUMENTS 6,067,290 A 5/2000 Paulraj et al.
6,285,654 B1 9/2001 Marchok et al.
(Continued)

FOREIGN PATENT DOCUMENTS

EP 1681780 A1 7/2006
KR 1020050079856 A 8/2005
(Continued)

OTHER PUBLICATIONS

"3rd Generation Partnership Project; Technical Specification Group Radio Access Network; Feasibility Study for Evolved Universal Terrestrial Radio Access (UTRA) and Universal Terrestrial Radio Access Network (UTRAN) (Release 7)," (Sep. 2006). 3GPP:Valbonne, France, TR 25.912 v7.1.0:1-57.
(Continued)

*Primary Examiner* — Hsinchun Liao
(74) *Attorney, Agent, or Firm* — Volpe Koenig

(57) ABSTRACT

A network device may schedule orthogonal frequency division multiplexing (OFDM) transmissions. The network device may determine frequency resources and streams to send to a user equipment (UE) based on the received first assistance information and channel quality associated with the UE. The network device may send to the first network device, second assistance information to facilitate the first network device to schedule OFDM transmissions. Scheduled OFDM transmissions from the network device may partially overlap in time with OFDM transmissions from the first network device.

8 Claims, 6 Drawing Sheets

Related U.S. Application Data continuation of application No. 11/820,269, filed on Jun. 18, 2007, now Pat. No. 8,725,077.

(60) Provisional application No. 60/815,039, filed on Jun. 19, 2006.

(51) Int. Cl.
*H04J 11/00* (2006.01)
*H04L 5/00* (2006.01)
*H04B 17/345* (2015.01)

(52) U.S. Cl.
CPC .......... *H04L 5/0023* (2013.01); *H04L 5/0028* (2013.01); *H04L 5/0073* (2013.01); *H04W 72/085* (2013.01); *H04W 72/082* (2013.01)

(56) References Cited

U.S. PATENT DOCUMENTS

| | | | |
|---|---|---|---|
| 6,694,147 B1* | 2/2004 | Viswanath | H04B 7/0671 370/318 |
| 2002/0086669 A1 | 7/2002 | Rosemarijn Bos et al. | |
| 2003/0035491 A1 | 2/2003 | Walton et al. | |
| 2005/0152387 A1 | 7/2005 | Utsunomiya et al. | |
| 2006/0255989 A1* | 11/2006 | Kim | H04L 1/0026 341/120 |

FOREIGN PATENT DOCUMENTS

| | | | |
|---|---|---|---|
| WO | 0176306 | A1 | 10/2001 |
| WO | 2005062497 | A1 | 7/2005 |
| WO | 2006063138 | A2 | 6/2006 |

OTHER PUBLICATIONS

"3rd Generation Partnership Project; Technical Specification Group Services and System Aspects General Universal Mobile Telecommunications System (UMTS) Architecture (Release 6)," (Dec. 2004). 3GPP:Valbonne, France, TS 23.101 v6.0.0:1-14.

"3rd Generation Partnership Project; Technical Specification Group Services and System Aspects; 3GPP System Architecture Evolution: Report on Technical Options and Conclusions (Release 7)," (Mar. 2007). 3GPP:Valbonne, France, TR 23.882 v1.9.0:1-184.

Demirkol, M. F. (2003). "Stream control in networks with interfering MIMO links," IEEE Wireless Communications and Networking, pp. 343-348.

Gaur, S. et al. (2004). "Interfering MIMO Links with Stream Control and Optimal Antenna Selection," IEEE Globecom 2004, pp. 3138-3142.

Marchetti, N. et al. (2004). "Allocation and Adaptation Techniques for Protocol Performance Improvement in Multicellular Wireless Packet Networks with MIMO Links," IEEE Globecom 2004, pp. 3143-3148.

International Search Report dated Oct. 1, 2007, for PCT Application No. PCT/EP2007/056037 filed Jun. 18, 2007, 15 pages.

Chinese Application No. 200780050639.9; Second Office Action dated Feb. 13, 2012.

Communication pursuant to Article 94(3) EPC dated Feb. 25, 2010 from European Patent Application No. 07 765 474_7-2412.

Japanese Patent Application No. 2009-515854; Office Action with Translation dated Jan. 10, 2012.

Korean Patent Application No. 10-2008-7031782; Office Action dated Oct. 31, 2011.

Non-Final Rejection, U.S. Appl. No. 11/820,269, dated Mar. 4, 2010.

Final Rejection, U.S. Appl. No. 11/820,269, dated Oct. 14, 2010.

Non-Final Rejection, U.S. Appl. No. 11/820,269, dated Mar. 27, 2012.

Final Rejection, U.S. Appl. No. 11/820,269, dated Oct. 15, 2012.

Non-Final Rejection, U.S. Appl. No. 11/820,269, dated Aug. 1, 2013.

Notice of Allowance, U.S. Appl. No. 11/820,269, dated Jan. 3, 2014.

Notice of Allowance, U.S. Appl. No. 14/268,545, dated Aug. 20, 2015.

Notice of Allowance, U.S. Appl. No. 14/268,545, dated Sep. 26, 2014.

Supplemental Notice of Allowance, U.S. Appl. No. 14/268,545, dated Nov. 24, 2014.

Non-Final Rejection, U.S. Appl. No. 14/268,545, dated Feb. 3, 2015.

Final Rejection, U.S. Appl. No. 14/268,545, dated Jun. 5, 2015.

* cited by examiner

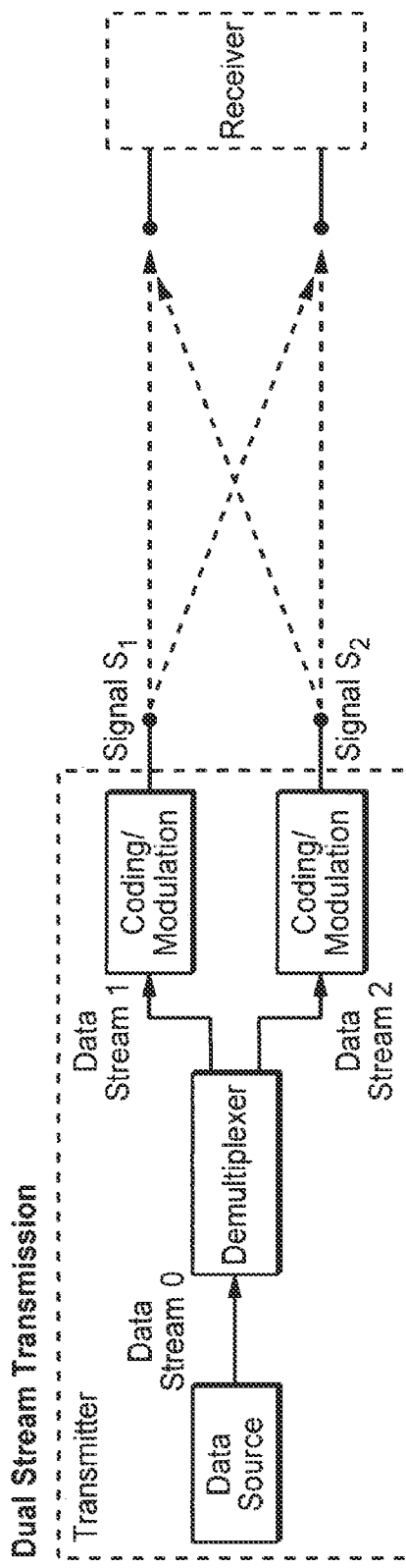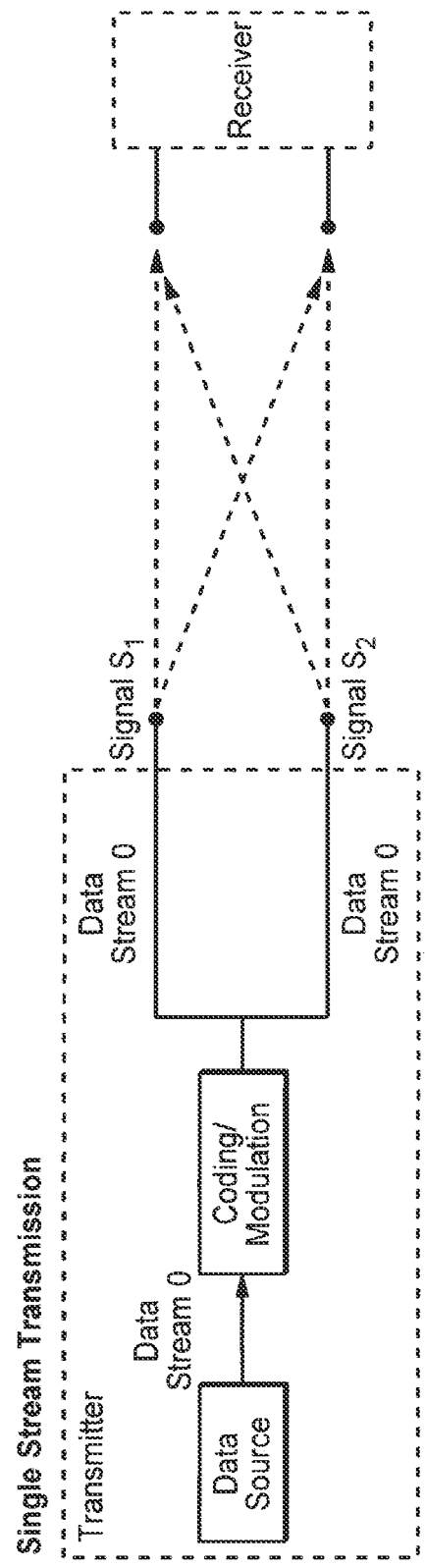

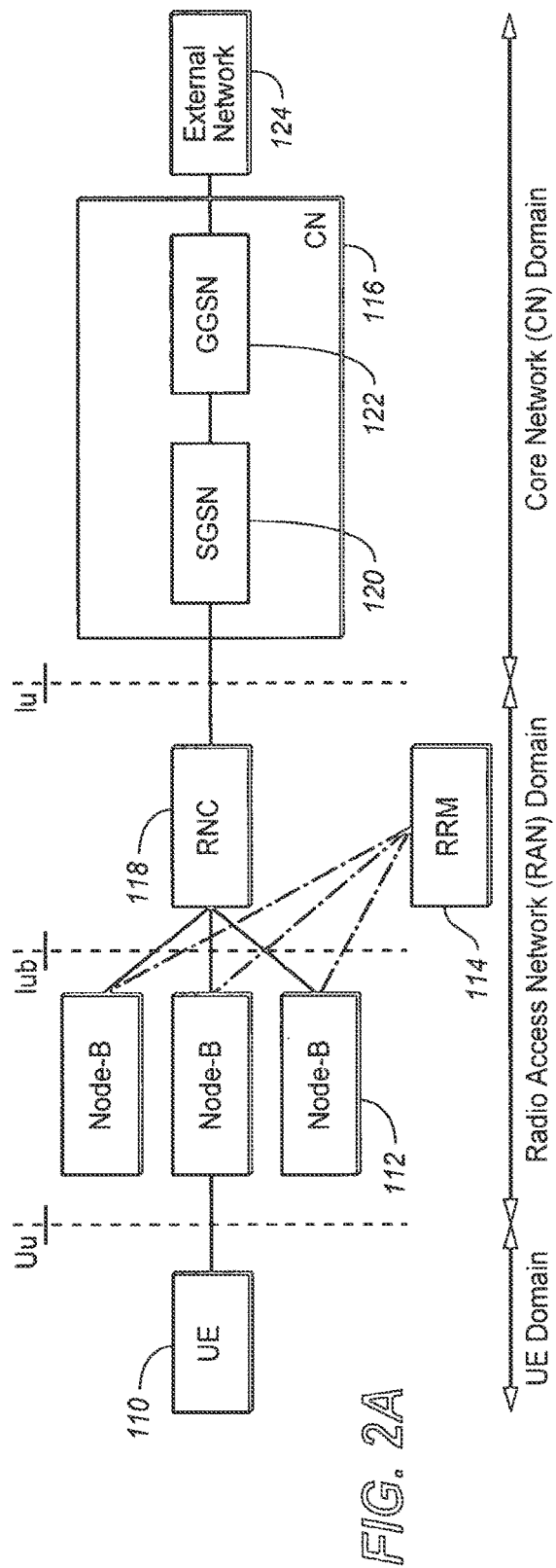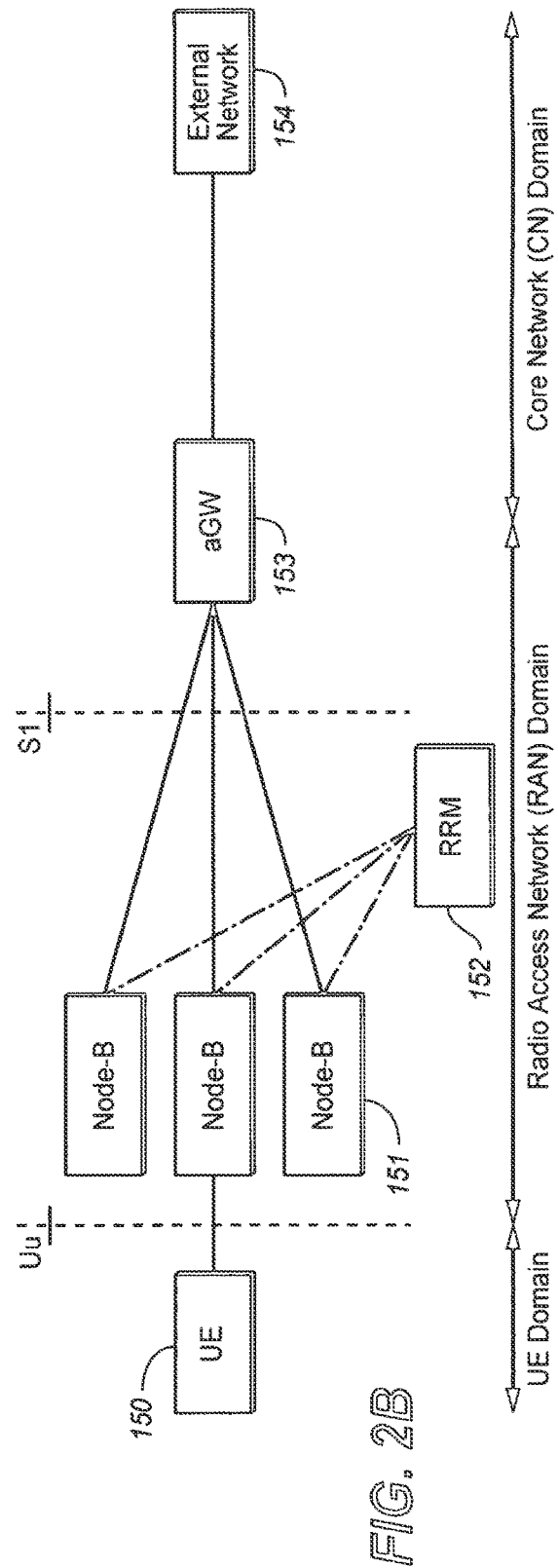

SCHEDULING AND COORDINATION IN A WIRELESS NETWORK

CROSS REFERENCE TO RELATED APPLICATIONS

This application is a continuation of U.S. patent application Ser. No. 14/268,545, filed May 2, 2014, which is a continuation of U.S. patent application Ser. No. 11/820,269, filed Jun. 18, 2007, which issued as U.S. Pat. No. 8,725,077 on May 13, 2014, which claims the benefit of U.S. Provisional Application Ser. No. 60/815,039 filed Jun. 19, 2006, which are incorporated by reference as if fully set forth.

BACKGROUND OF THE INVENTION

The invention relates to cancellation of interference from neighboring cells in a wireless communications system.

It is well known that the performance of cellular systems is limited due to the presence of intercell interference. For example, in the downlink, users at the edge of the cell may experience interference from neighboring cells at received power levels similar to that of the signal from the serving cell. This is especially the case for densely planned systems employing low frequency-reuse factors. Indeed, in the limit, a frequency reuse of one may be used. While a reuse of one is desirable to maximize the amount of time/frequency resources available to each cell in the system, the intercell interference problem it creates naturally results in a lowering of the data rates achievable for users at the edges of the cell. Transmissions to users with low signal to noise plus interference ratios (SNIR) require information redundancy and hence a low code rate to achieve the desired decoding quality (measured for example as block error rate, BLER), resulting in a corresponding reduction in the data rate.

The use of multiple-input multiple-output (MIMO) antenna systems is also well known. In these systems, data may be transmitted to a user over sets of 3933117-1 channels existing between $n_{T_x}$ transmit antennas and $n_{R_x}$ receive antennas. There are thus a total of $n_{T_x} \times n_{R_x}$ channels which make up the composite MIMO channel set. Multiple simultaneous data streams may be transmitted over the channel set if the channels of the set are sufficiently statistically independent and uncorrelated.

It is further well known that the ability of the system to successfully transmit multiple simultaneous and different data streams over the MIMO channel set is also a function of the channel SNIR. Successful transmission of parallel streams is more likely in channels with high SNIR and less likely in channels with low SNIR. Thus, the gain of MIMO transmission (in terms of achievable link throughput), compared to its transmit and receive diversity counterparts, is increased for cases of higher SNIR and higher channel decorrelation. For low SNIR or high channel correlation, the gains of MIMO diminish and instead transmission of a single data stream can result in better overall performance than transmission of multiple parallel data streams, and thus is preferred. Note that the multiple channels in the set may still be used to provide transmit/receive diversity benefits; however, no attempt is made to transmit multiple parallel data streams in this case.

FIGS. 1A and 1B illustrate one example of two-stream MIMO transmission over a 2×2 channel set, and one example of single-stream non-MIMO transmission over the same channel set, respectively. The primary difference is that in the two-stream MIMO case, each transmit antenna is conveying different information, whereas in the single stream case, the information transmitted by each antenna is the same (although the actual signal waveforms may differ).

It is further known that systems may dynamically switch between single and multi-(e.g. dual) stream transmission according to variations observed in the channel SNIR or as the statistical correlation between the channels in the channel set is seen to vary. In this way, users experiencing poorer radio conditions (low SNIR and/or high channel correlation) will receive single-stream transmissions and users with good radio conditions (high SNIR and/or low channel correlation) will be able to exploit multi-stream transmission to achieve higher data rates and link throughput.

SUMMARY OF THE INVENTION

Embodiments of the invention provide a controller, in a cellular wireless network for cancellation of interference from neighboring cells. Logic in the controller determines channel quality of a radio channel between a first base station and a UE. Scheduling logic causes the first base station and a second base station to adjust the number of data streams used for communication within a time period, as a function of the channel quality.

In some embodiments, the scheduling logic instructs the first and second base stations to reduce the number of data streams used by each of the base stations in response to a low channel quality. The scheduling logic also instructs the first and second base stations to increase the number of data streams used by each of the base stations in response to a high channel quality.

Other embodiments provide an apparatus for reducing interference in a receiver that receives N data streams. Signal processing logic receives the N data streams, where N-M of the data streams represents interference with respect to M desired data streams, and cancels the N-M data streams so as to receive the M desired data streams. The N data streams may be received from multiple base stations, or multiple UEs.

BRIEF DESCRIPTION OF THE FIGURES

FIG. 1A illustrates an example of a two-stream MIMO transmission over a 2×2 channel set;

FIG. 1B illustrates an example of a single-stream MIMO transmission over a 2×2 channel set;

FIG. 2A illustrates a cellular communication system according to embodiments of the invention;

FIG. 2B illustrates a cellular communication system according to 3GPP LTE specifications;

DETAILED DESCRIPTION OF THE INVENTION

Figure 3A:
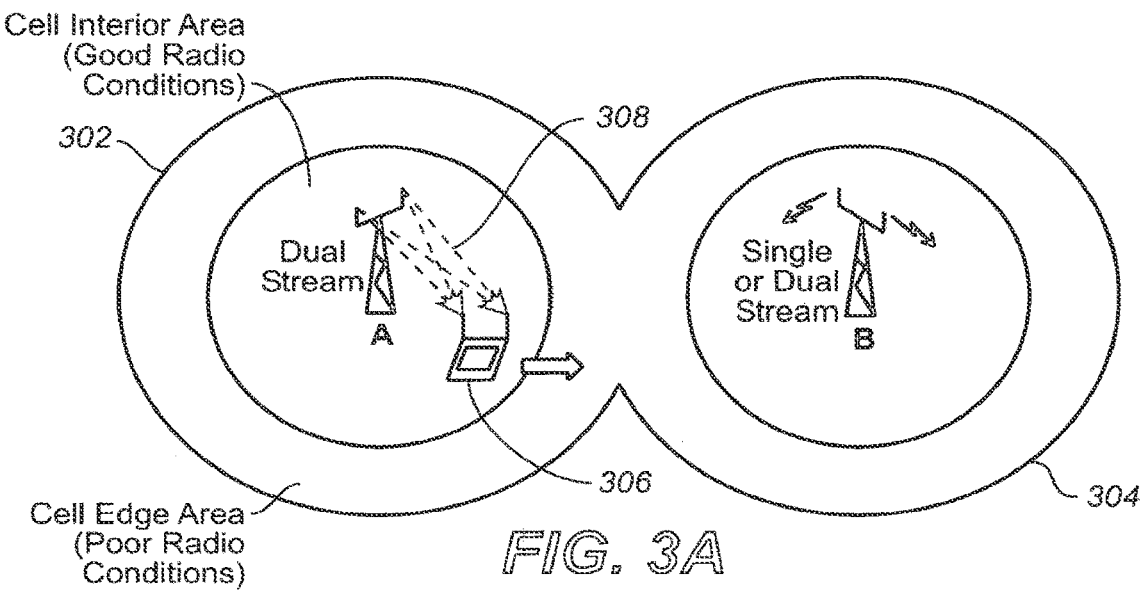
FIGS. 3A-3D illustrate examples of transmissions to a UE in different positions between two cells according to embodiments of the invention.

FIG. 2A illustrates an example of a cellular communication system according to embodiments of the invention. The network includes a user equipment (UE) domain, a radio access network (RAN) domain, and a core network domain. The UE domain includes user equipment 110 that communicates with at least one base station 112 in the RAN domain via a wireless interface. The RAN domain may also include a network controller 118 (e.g., radio network controller), such as that used in UMTS systems.

The core network (CN) 116 includes, in this example, a serving GPRS support node (SGSN) 120, and a gateway GPRS support node (GGSN) 122. The core network is coupled to an external network 124, such as the Internet. The SGSN 120 is responsible for session control, including keeping track of the location of the UEs. The GGSN 122 concentrates and tunnels user data within the core network 116 to the ultimate destination (e.g., an Internet service provider) in the external network 124.

FIG. 2B illustrates an example of a system according to the 3GPP LTE specification. As in FIG. 2A, the system includes UEs 150, Node Bs 151, an RRM 152, and an external network 154. This system also includes an access gateway (aGW) 153.

Further details regarding exemplary communications systems that may implement embodiments of the invention may be found in 3GPP UMTS technical specifications, such as TR 23.882, "3GPP System Architecture Evolution: Report on Technical Options and Conclusions"; TR 25.912, "Feasibility Study for Evolved UTRA and UTRAN"; TS 23.101, "General Universal Mobile Telecommunications System (UMTS) Architecture"; all of which are incorporated by reference herein.

According to embodiments of the invention, the scheduling of packets for transmission (including the allocation of resources) may be performed in a centralized or distributed manner within the system of FIG. 2A or FIG. 2B. In the centralized case, a single scheduler may have command over multiple cells or multiple Node Bs. In the distributed case, a single scheduler may have command only over one cell, or only over cells (i.e., sectors) of the same Node B. In the distributed case, the schedulers may communicate with one another, and pass relevant data among each other to assist with the scheduling process. This may be achieved via direct scheduler-to-scheduler interfaces, or the communication may pass through a common centralized point or node.

As an example of centralized coordination, the RRM function may be responsible in the RAN domain for high-level coordination and management of the user's usage of the available radio resources. A finer level of management of the radio resources may be performed by individual schedulers residing within each Node-B, RNC, or aGW, pursuant to instructions from the network component providing RRM coordination functionality. This RRM functionality may be provided by the separate RRM unit 114/152, or by a Node B, the RNC or the aGW acting as a "master" coordinator.

Alternatively, such scheduling functionality (and the coordination thereof) may be distributed among the Node Bs, RNC, RRM or aGW or other controller in the core network. The RRM function may be located within the Node-Bs, within the aGW or RNC element, or within the separate RRM server element in the RAN domain (as shown), in which case the responsible network elements communicate among themselves to coordinate scheduling. In a particular example, the schedulers may be located in each Node B, in which case the Node Bs would communicate with each other to coordinate scheduling.

Referring to FIGS. 1A and 1B, when a user is at the cell edge and experiencing poor radio conditions, single stream transmission may be used. However, in interference-limited systems (such as is common when designing for high capacity), the poor SNIR that the user is experiencing is often due not to thermal noise in the receiver but due to transmissions being made in neighboring cells (intercell interference). To the MIMO-capable user equipment (UE) receiver, this interfering signal can be considered to be a second data stream transmission although transmitted from a separate base station to the wanted data stream transmission from the serving cell. Thus two single stream transmissions from each of two cells can be considered to look like a two-stream transmission from a single cell. Consequently, the UE receiver is able to jointly estimate the data modulation symbols from both the serving and interfering cells and to cancel the interference being imparted on the serving cell transmission.

A UE receiver with two receive antennas is able to jointly detect up to two data streams. Attempts to detect more than two data streams results in an under-determined mathematical problem, for which the solutions calculated by the receiver may not be accurate. Thus, for this example, we assume that the UE can cancel $n_{R_x}-1$ intercell streams if the serving cell is transmitting a single stream. In general, if the serving cell is transmitting M streams of interest to the UE, then the UE can cancel $n_{R_x}-M$ intercell streams.

As to the current example, this implies that if the neighboring cell is transmitting two streams (and the serving cell only one), then the UE is only able to cancel one of the neighbor cell streams (and so perhaps only 50% of the interfering power from that cell). In contrast, when the neighbor cell is also transmitting only a single stream (for example, it is also transmitting to a cell edge user), then there is the possibility for the UE to cancel up to 100% of the interfering power from that cell. It is therefore advantageous that when serving UEs that are experiencing high levels of interference, both the serving and interfering cells align their single stream transmissions and avoid overlapping of single stream transmission in a serving cell with dual (or multi-) stream transmission in an interfering cell on the same time/frequency resources. Note this does not require transmission from only a single antenna at each base station, just that a single information stream is transmitted over the (possibly) multiple antennas. Note that the above description is extensible (e.g. in the case of an increased number $n_{R_x}$ of antennas at the UE) such that when serving UEs that are experiencing high interference levels, the serving and interfering cells align their transmissions of a respective lower number N of streams from each of the cells (where N be larger than 1) and overlapping of a low number of streams in the serving cell with a high number of streams in the interfering cell is avoided.

FIGS. 3A-D illustrate the situation where a mobile transceiver (UE) moves from good radio conditions in cell A, through the cell border between cells A and B, and on into the interior of cell B. Referring to FIG. 3A, when the UE 306 is located well within cell A 302, the interference from cell B is weak, and cell A may use dual-stream MIMO transmission 308 to the UE 306. The receiver of the UE 306 does not try to detect the signal from cell B 304 and uses the available "degrees of freedom" in the receiver processing to jointly detect the two data streams from cell A 302. Cell B 304 is unrestricted regarding the number of streams it may transmit due to the fact that the UE 306 is not trying to detect the signal from cell B 304.

Figure 3B:
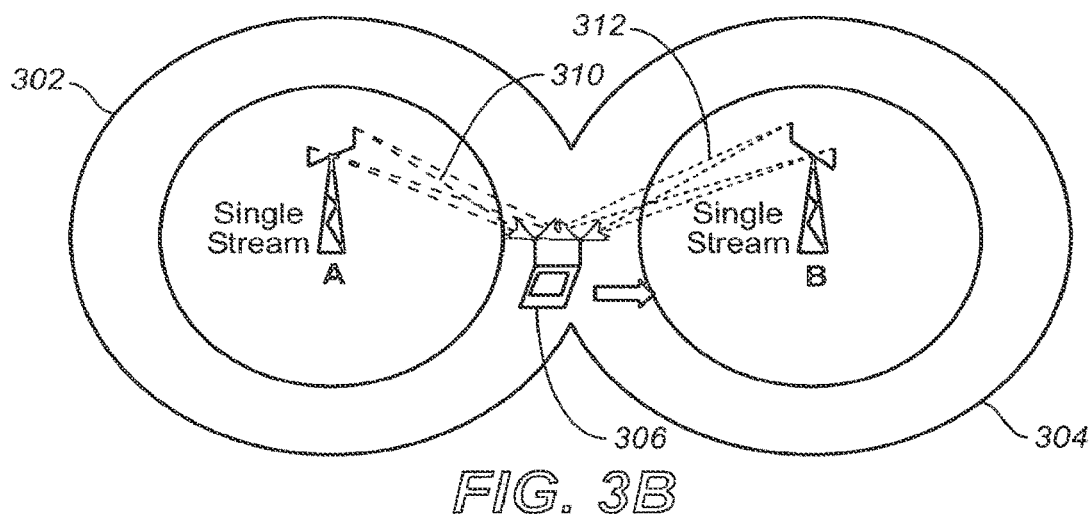

Referring to FIG. 3B, at the cell border, the interference from cell B 304 is strong and cell A 302 changes to a single-stream transmission. A degree of freedom is released in the receiver of the UE 306 upon moving from dual-stream to single-stream 310 reception from cell A 302. The UE 306 may then jointly detect the single stream interfering transmission 312 from cell B 304 such that the interference may be cancelled to some degree. The schedulers controlling cell A 302 and cell B 304 are coordinated. The schedulers may be located within the Node-Bs or within the RNC or aGW and are coordinated via the RRM functionality. The RRM functionality may be distributed among the Node-Bs, or may be located within a centralized node such as an RNC, aGW or within a dedicated RRM server. Coordination between the schedulers may be effected to ensure that single-stream transmissions from cell A 302 coincide with single stream transmissions from cell B 304. This enables the UE 306 to cancel up to 100% of the power from cell B 304.

Figure 3C:
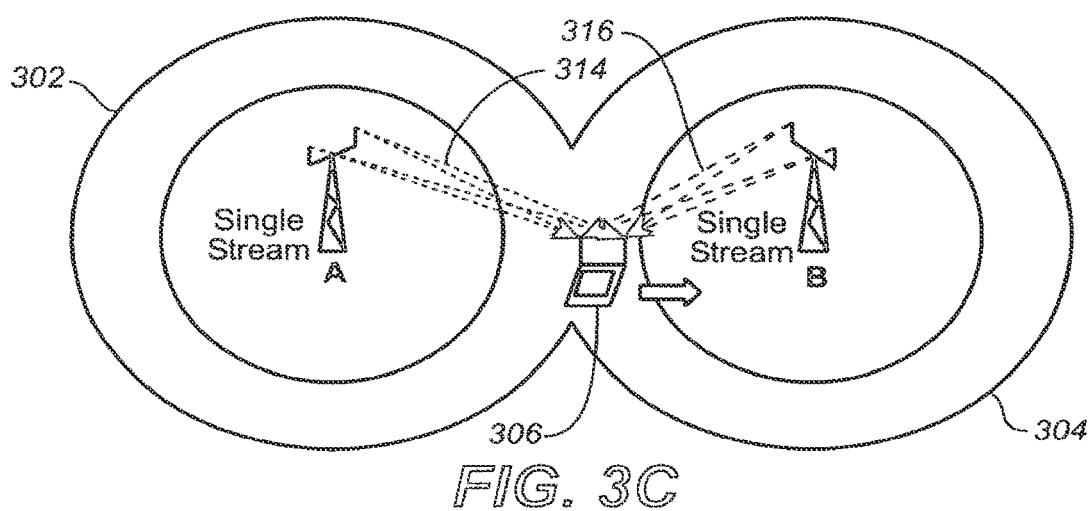

Referring to FIG. 3C, at the cell borders, a handover occurs (the serving cell for the UE 306 changes from cell A 302 to cell B 304), and the UE 306 continues to jointly detect the data symbols of the single-stream transmissions from both cells 314, 316. Only now, cell A 302 is the interfering cell and cell B 304 contains the desired user data.

Figure 3D:
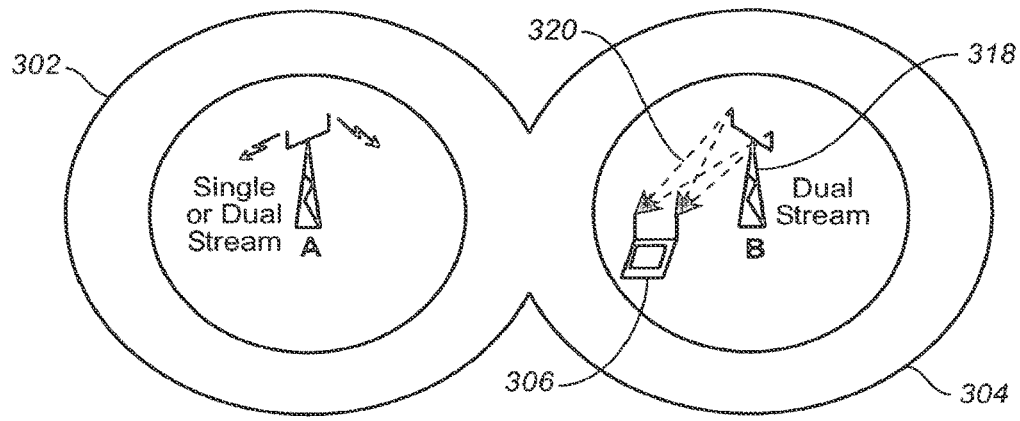

Referring to FIG. 3D, as the UE 306 moves further into cell B 304, the radio conditions improve and the interference from cell A 302 weakens. Upon receiving information of this condition, the scheduler controlling cell B 304 may instruct the base station 318 controlling cell B 304 to switch to dual stream transmission 320 to the UE 306, and the UE 306 no longer needs to jointly detect both cells (only cell B 304 is actively detected by the UE 306 in this example). This decision may also be taken into account by the coordination functionality (e.g. RRM) such that cell A 302 is no longer restricted to transmission of a single stream (any number of streams may now be transmitted by cell A 302).

The RRM functionality (whether within a separate RRM server or distributed among other network elements) that coordinates the number of streams transmitted by each of the cells may be operable on a dynamic basis according to the particular channel conditions of users in the system requesting service. In this mode of operation, the RRM function may consider, on a short term basis, the traffic loading in each cell under its jurisdiction, the channel conditions of the users that need to be served in the cells, and the physical resources available for communication.

In this mode, for example, assume two base stations each communicating in different, adjacent cells with a different UE over the same time/frequency/code resources. Thus, communications from one cell would be considered interference by the other cell. Also, assume that one UE had a strong channel connection with its base station, whereas the other UE had a weak channel connection with its own base station. In one embodiment of the system, both base stations would have a low number of data streams scheduled to accommodate the weak channel to reduce intercell interference.

Alternatively, the RRM functionality may operate on a slower "semi-static" basis, or even on a fixed basis. In these modes of operation, the RRM function may assign a portion of the total available physical resources (e.g. time/frequency/code resources) for UEs in poor channel conditions, while a separate portion of the total physical resources is reserved for UEs in good channel conditions. In other words, the UEs having strong channel conditions would not share all the same resources as the UEs having poor channel conditions. The assignments would typically apply to multiple cells that all lie within the jurisdiction of the RRM function. UEs in poor channel conditions are assigned to the physical resource portion reserved for poor UEs, whereas UEs in good channel conditions are assigned to the physical resource portion reserved for good UEs. A low number of data streams are transmitted in the portion assigned to poor UEs, and a higher number of data streams are transmitted in the portion assigned to good UEs, thus avoiding the "lowest common denominator" approach (discussed above) of assigning the same number of data streams to both "poor-channel" and "strong channel" UEs based upon the weaker channels. In this way, each scheduler may decide autonomously to schedule a UE under its control in one or the other physical resource portion safe in the knowledge that the number of streams transmitted by another cell on the same physical resources will be appropriate for the channel conditions being experienced by the UE. Updates to the amount of physical resources reserved for each portion may be made relatively slowly by the RRM function in response to the observed proportion of users experiencing good and bad channel conditions respectively. Categorization of each UE may be made by the schedulers to continually reassign users to the appropriate physical resource portion according to any updated channel condition information received.

Figure 4:
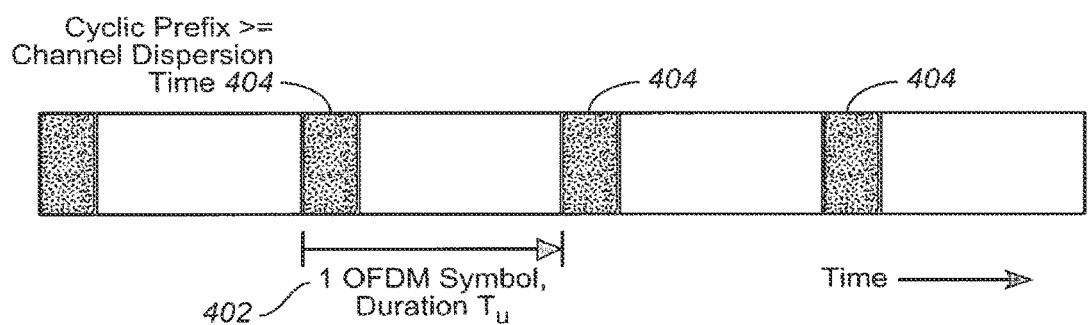
FIG. 4 illustrates an embodiment of OFDM symbols, each with a pre-pended cyclic prefix portion.

FIG. 4 depicts orthogonal frequency division multiplexing (OFDM) symbols, each with a pre-pended cyclic prefix portion. Embodiments of the present invention may be employed in any cellular system, including those using code division multiple access (CDMA) or OFDM modulation schemes. In particular as to OFDM, such a system employs the transmission of data symbols over multiple orthogonal narrow-band sub-carriers. An OFDM "symbol" 402 lasts for time $T_u$ and comprises a cyclic prefix portion 404 which is used to allow for so-called multi-path energy over the channel dispersion length to be easily combined in the receiver without the multi-path components impacting adjacent OFDM symbols in time.

In OFDM systems, data is transmitted across multiple parallel narrow-band sub-carriers by modulating each data symbol with an orthogonal complex exponential (tone). The sub-carriers are orthogonal to each other by virtue of the orthogonal modulation waveforms, and hence, under reasonable radio conditions, it may be ensured that each symbol does not cause interference with other symbols transmitted at the same time on other sub-carriers. Assuming each OFDM symbol occupies K subcarriers, K data modulation symbols are typically transmitted per OFDM symbol. A data modulation symbol may be, for example, a QPSK symbol (carrying 2 bits), or a 16-QAM symbol (carrying 4 bits).

The sub-carrier bandwidth is typically narrow such that in commonly-experienced multipath (frequency selective) radio channels, the individually-arriving channel rays (in time) are shorter than the fundamental period of the receiver's time-domain pulse shape for each sub-carrier. Hence the channel rays are not resolvable once the receiver filter has been applied. Thus, the multi-path signal components become summed for each narrow-band sub-carrier as a natural part of the receiver processing. In many channel types this results in a flat-fading characteristic for each sub-carrier with a mean composite channel power equal to the summation of the powers of the contributing channel paths. This aspect, wherein multiple arriving signal paths are naturally combined within the narrow sub-carrier bandwidth, may be exploited to allow for signals carrying the same modulation symbol (same content) to be combined as a natural part of the receiver processing. No additional or special processing is required to combine the energy of the multiple copies of the signal. This includes both the case where multiple copies of the signal arrive due to time dispersion in the radio channel, and the case where multiple copies of the same signal arrive due to them having been intentionally transmitted from different sources/antennas over different channels.

Figure 5:
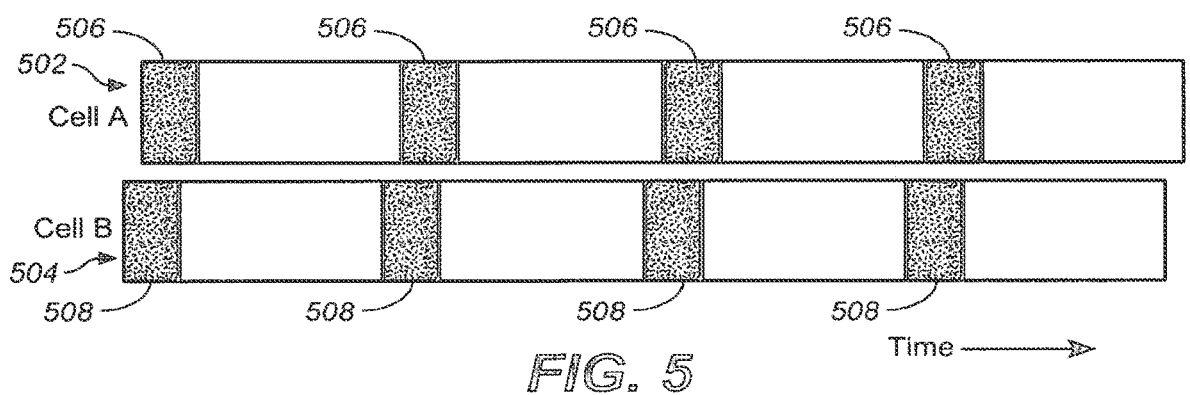
FIG. 5 illustrates embodiments of reception of signals from cell A and cell B that are substantially time-aligned.

Referring to FIG. 5, the signal from cell A 502 and the signal from cell B 504 are substantially time-aligned such that at the receiver they arrive within the cyclic prefix duration. The cyclic prefixes 506 of the cell A signal 502 may be substantially aligned with the cyclic prefixes 508 of the cell B signal 504. This may be achieved by means of synchronizing cells A and B as is commonly performed in cellular networks. Synchronisation may be achieved by aligning the timing of each of the cells with a common reference time signal such as GPS, or a network clock. Other methods of synchronization are also possible wherein the cells communicate timing messages with one another enabling early/late adjustments to be made and for the system to self-coordinate its timing without the use of a common clock When the signals are synchronized such that they arrive at the UE receiver within the cyclic prefix duration, this allows for the signals to be combined (summed) without additional processing. For other modulation systems (e.g. FDMA or CDMA), substantial time alignment may be considered to be an alignment of the signals such that they fall within an equalizer time window or similar time period, allowing for the receiver to capture the energy arriving from both cells.

The multi-carrier OFDM system can be modeled simply as multiple individual narrow-band single carrier systems.

The system model for a single sub-carrier is:

$$\underline{r} = H\underline{s} + \underline{n}$$

Here, $\underline{r}$ is a vector of size $n_{R_x} \times 1$ and contains the received signal at each of the UE receiver antennas. $\underline{s}$ is the $n_{T_x} \times 1$ vector of transmitted data symbols (one for each basestation Tx antenna) and $\underline{n}$ is a vector of noise samples (size $n_{R_x} \times 1$).

H is the channel matrix of size $n_{R_x} \times n_{T_x}$.

Figure 6:
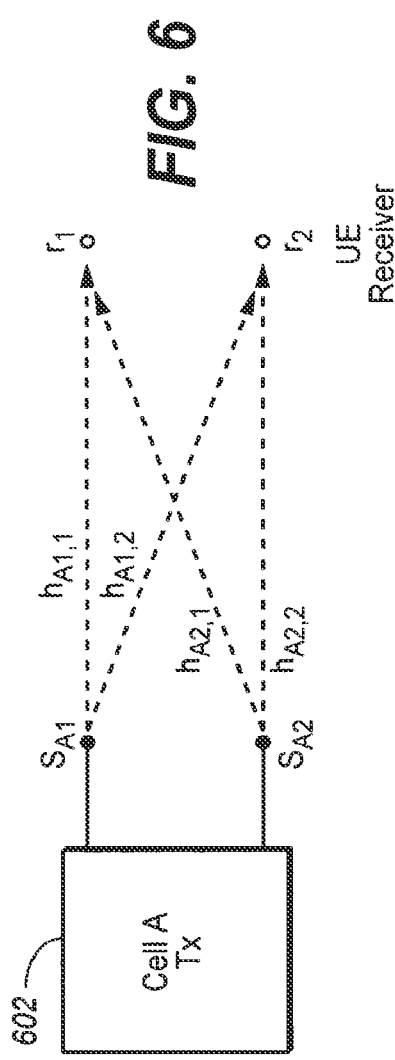
FIG. 6 illustrates an embodiment of a duel-stream transmission over a 2×2 channel system according to embodiments of the invention.

FIG. 6 illustrates a dual stream transmission in cell A 602 over a 2×2 channel system.

The system is modeled according to the equation below $$\begin{bmatrix} r_1 \\ r_2 \end{bmatrix} = \begin{bmatrix} h_{A1,1} & h_{A2,1} \\ h_{A1,2} & h_{A2,2} \end{bmatrix} \times \begin{bmatrix} s_{A1} \\ s_{A2} \end{bmatrix} + \begin{bmatrix} n_1 \\ n_2 \end{bmatrix}$$

Here, $h_{Ai,j}$ represents the channel from cell A antenna i to UE receive antenna j. $s_{Ai}$ represents the signal transmitted from cell A antenna i.

Given the received signal $\underline{r}$, estimates of $\underline{s}$ may be calculated in several ways. These include the zero-forcing (ZF), Minimum Mean Square Error (MMSE) and Maximum Likelihood (ML) techniques. The following equations employ the zero forcing approach, as it represents the simplest case for descriptive purposes.

As the channel matrix H is square, an inverse may be calculated $H^4$ such that $H \times H^{-1}$ is equal to the identity matrix (I).

Then, the ZF solution to the problem is:

$$\begin{bmatrix} \hat{s}_{A1} \\ \hat{s}_{A2} \end{bmatrix} = \begin{bmatrix} h_{A1,1} & h_{A2,1} \\ h_{A1,2} & h_{A2,2} \end{bmatrix}^{-1} \times \begin{bmatrix} r_1 \\ r_2 \end{bmatrix}$$

Figure 7:
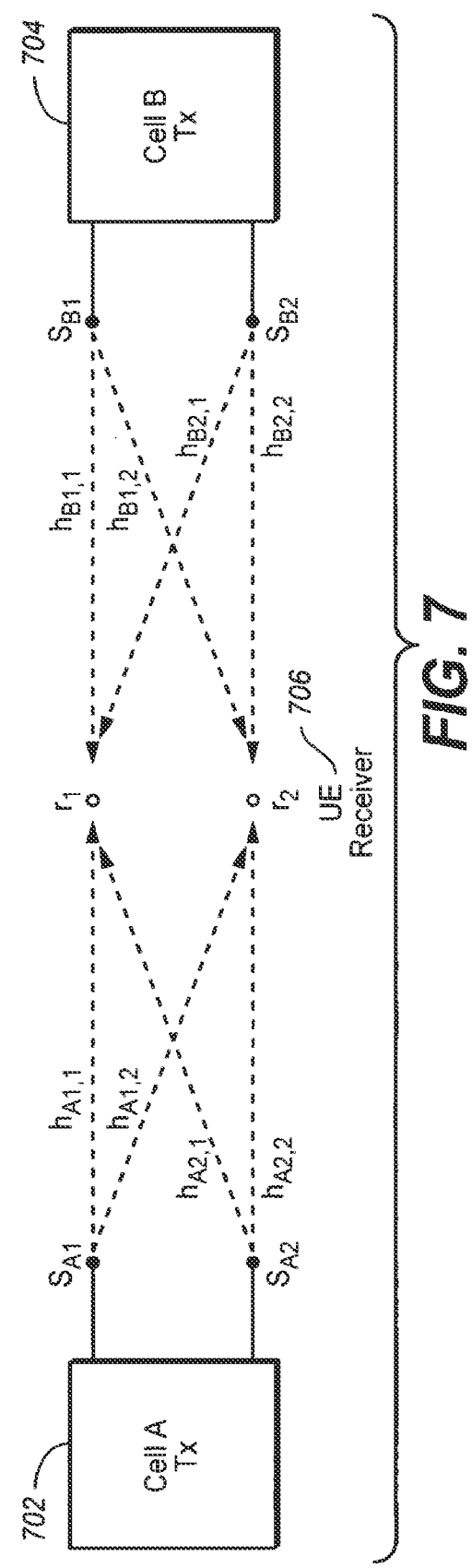
FIG. 7 illustrates an embodiment of two single-stream transmissions over a 2×2 channel system according to embodiments of the invention.

Now, referring to FIG. 7, consider the case of two single stream transmissions, one from cell A 702 and one from cell B 704. Each is over its own 2×2 channel system.

In this case, the system is modeled as:

$$\begin{bmatrix} r_1 \\ r_2 \end{bmatrix} = \begin{bmatrix} h_{A1,1} & h_{A2,1} & h_{B1,1} & h_{B2,1} \\ h_{A1,2} & h_{A2,2} & h_{B1,2} & h_{B2,2} \end{bmatrix} \times \begin{bmatrix} s_{A1} \\ s_{A2} \\ s_{B1} \\ s_{B2} \end{bmatrix} + \begin{bmatrix} n_1 \\ n_2 \end{bmatrix}$$

However, in the single stream case, the same symbol is transmitted from all antennas of the same basestation. Thus, $s_{A1} = s_{A2} = s_A$ and $s_{B1} = s_{B2} = s_B$.

This means that the above system equation reduces to:

$$\begin{bmatrix} r_1 \\ r_2 \end{bmatrix} = \begin{bmatrix} (h_{A1,1} + h_{A2,1}) & (h_{B1,1} + h_{B2,1}) \\ (h_{A2,1} + h_{A2,2}) & (h_{B1,2} + h_{B2,2}) \end{bmatrix} \times \begin{bmatrix} s_A \\ s_B \end{bmatrix} + \begin{bmatrix} n_1 \\ n_2 \end{bmatrix}$$

Again the channel matrix is square and so an inverse may be found. The zero forcing estimate of the transmitted symbol vector $[s_A, s_B]$ in this case is:

$$\begin{bmatrix} \hat{s}_A \\ \hat{s}_B \end{bmatrix} = \begin{bmatrix} (h_{A1,1} + h_{A2,1}) & (h_{B1,1} + h_{B2,1}) \\ (h_{A1,2} + h_{A2,2}) & (h_{B1,2} + h_{B2,2}) \end{bmatrix}^{-1} \times \begin{bmatrix} r_1 \\ r_2 \end{bmatrix}$$

Thus, the UE receiver 706 for the two single stream case (from different cells) is very similar to that of the two stream case (from a single cell) and can be used to cancel interference from one neighbor cell.

While the invention has been described in terms of particular embodiments and illustrative figures, those of ordinary skill in the art will recognize that the invention is not limited to the embodiments or figures described. Although embodiments of the present invention are described, in some instances, using UMTS terminology, those skilled in the art will recognize that such terms are also used in a generic sense herein, and that the present invention is not limited to UMTS or 3G systems.

Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic and/or an appropriate combination thereof, as would be recognized by one skilled in the art to carry out the recited functions.) Software and firmware can be stored on computer-readable media. Some other processes can be implemented using analog circuitry, as is well known to one of ordinary skill in the art. Additionally, memory or other storage, as well as communication components, may be employed in embodiments of the invention.

Figure 8:
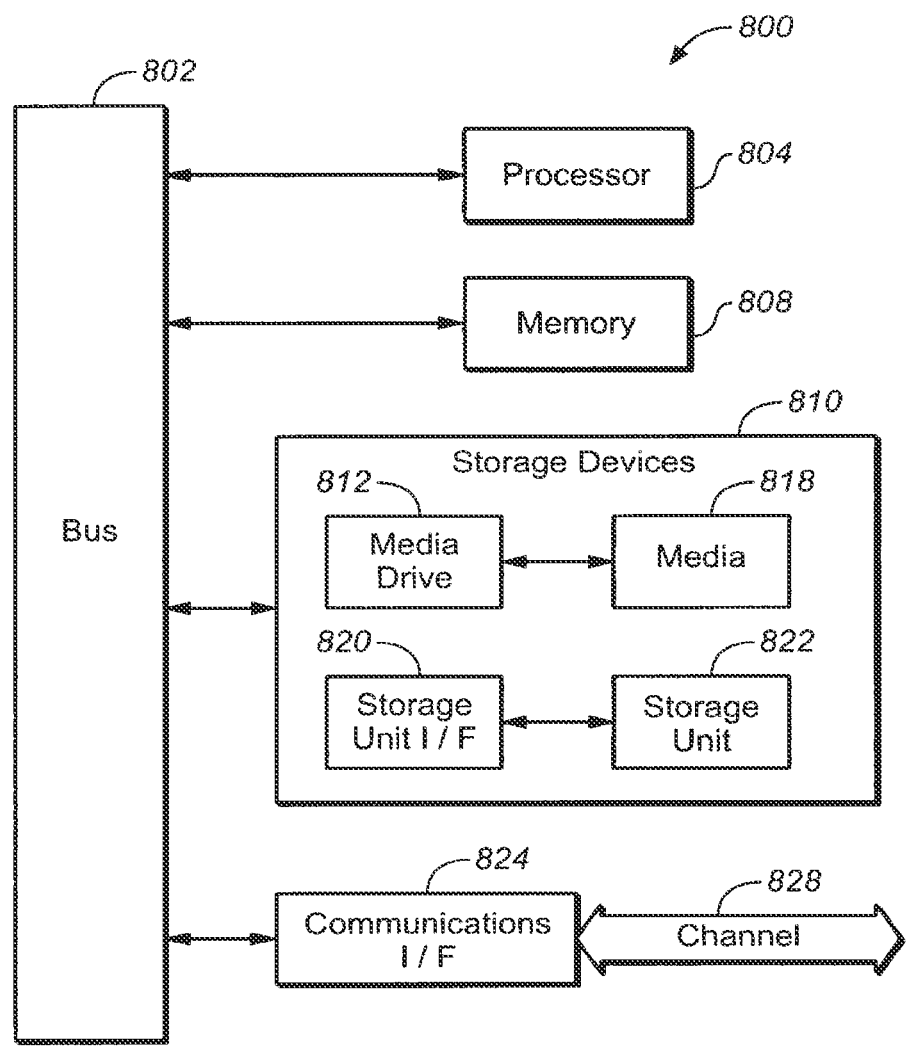
FIG. 8 illustrates a computer system that may be employed to implement embodiments of the invention.

FIG. 8 illustrates a typical computing system 800 that may be employed to carry out processing functionality in embodiments of the invention. Those skilled in the relevant art will also recognize how to implement the invention using other computer systems or architectures. Computing system 800 may represent, for example, a desktop, laptop or notebook computer, hand-held computing device (PDA, cell phone, palmtop, etc.), mainframe, supercomputer, server, client, or any other type of special or general purpose computing device as may be desirable or appropriate for a given application or environment. Computing system 800 can include one or more processors, such as a processor 804. Processor 804 can be implemented using a general or special purpose processing engine such as, for example, a microprocessor, controller or other control logic. In this example, processor 804 is connected to a bus 802 or other communication medium.

Computing system 800 can also include a main memory 808, preferably random access memory (RAM) or other dynamic memory, for storing information and instructions to be executed by processor 804. Main memory 808 also may be used for storing temporary variables or other intermediate information during execution of instructions to be executed by processor 804. Computing system 800 may likewise include a read only memory ("ROM") or other static storage device coupled to bus 802 for storing static information and instructions for processor 804.

The computing system 800 may also include information storage mechanism 810, which may include, for example, a media drive 812 and a removable storage interface 820. The media drive 812 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 818, may include, for example, a hard disk, floppy disk, magnetic tape, optical disk, CD or DVD, or other fixed or removable medium that is read by and written to by media drive 812. As these examples illustrate, the storage media 818 may include a computer-readable storage medium having stored therein particular computer software or data.

In alternative embodiments, information storage mechanism 810 may include other similar instrumentalities for allowing computer programs or other instructions or data to be loaded into computing system 800. Such instrumentalities may include, for example, a removable storage unit 822 and an interface 820, such as a program cartridge and cartridge interface, a removable memory (for example, a flash memory or other removable memory module) and memory slot, and other removable storage units 822 and interfaces 820 that allow software and data to be transferred from the removable storage unit 818 to computing system 800.

Computing system 800 can also include a communications interface 824. Communications interface 824 can be used to allow software and data to be transferred between computing system 800 and external devices. Examples of communications interface 824 can include a modem, a network interface (such as an Ethernet or other NIC card), a communications port (such as for example, a USB port), a PCMCIA slot and card, etc. Software and data transferred via communications interface 824 are in the form of signals which can be electronic, electromagnetic, optical or other signals capable of being received by communications interface 824. These signals are provided to communications interface 824 via a channel 828. This channel 828 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms "computer program product" and "computer-readable medium" may be used generally to refer to media such as, for example, memory 808, storage device 818, storage unit 822, or signal(s) on channel 828. These and other forms of computer-readable media may be involved in providing one or more sequences of one or more instructions to processor 804 for execution. Such instructions, generally referred to as "computer program code" (which may be grouped in the form of computer programs or other groupings), when executed, enable the computing system 800 to perform features or functions of embodiments of the present invention.

In an embodiment where the elements are implemented using software, the software may be stored in a computer-readable medium and loaded into computing system 800 using, for example, by a removable storage media 818, media drive 812 or communications interface 824. The control logic (in this example, software instructions or computer program code), when executed by the processor 804, causes the processor 804 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims Additionally, although a feature may appear to be described in connection with particular embodiments, one skilled in the art would recognize that various features of the described embodiments may be combined in accordance with the invention.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A network device comprising:
an interface configured to receive, from a first network device, first assistance information that indicates channel conditions at the first network device;
a processor is configured to schedule, dynamically, orthogonal frequency division multiplexing (OFDM) transmissions, wherein the processor determines frequency resources and a number of streams to send to a user equipment (UE) based on the first assistance information and channel quality associated with the UE; and
the processor is configured to send, to the first network device, second assistance information to facilitate the first network device to schedule OFDM transmissions, wherein scheduled OFDM transmissions of the network device selects frequency resources-based on the first assistance information.

2. The network device of claim 1, wherein the network device is a part of a serving cell and the first network device is a part of an interfering cell.

3. The network device of claim 1, wherein the channel quality substantially below a threshold is a low channel quality and the channel quality substantially above a threshold is a high channel quality.

4. The network device of claim 1, wherein the network device or the first network device is configured as a Node B.

5. A method performed by a network device, the method comprising:

receiving, from a first network device, first assistance information that indicates channel conditions at the first network device;

scheduling, dynamically, orthogonal frequency division multiplexing (OFDM) transmissions, wherein the network device determines frequency resources and a number of streams to send to a user equipment (UE) based on the first assistance information and channel quality associated with the UE; and sending, to the first network device, second assistance information to facilitate the first network device to schedule OFDM transmissions, wherein scheduled OFDM transmissions of the network device avoids frequency resources, based on the first assistance information.

6. The method of claim 5, wherein the network device is a part of a serving cell and the first network device is a part of an interfering cell.

7. The method of claim 5, wherein the channel quality substantially below a threshold is a low channel quality and the channel quality substantially above a threshold is a high channel quality.

8. The method of claim 5, wherein the network device or the first network device is configured as a Node B.

* * * * *